(12) United States Patent
Shiba et al.

(10) Patent No.: US 10,451,470 B2
(45) Date of Patent: Oct. 22, 2019

(54) FLOW RATE MEASUREMENT DEVICE

(71) Applicant: Panasonic Intellectual Property Management Co., Ltd., Osaka-shi, Osaka (JP)

(72) Inventors: Fumikazu Shiba, Nara (JP); Yuji Nakabayashi, Nara (JP); Kouichi Takemura, Nara (JP); Yuji Fujii, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 79 days.

(21) Appl. No.: 14/397,582

(22) PCT Filed: May 16, 2013

(86) PCT No.: PCT/JP2013/003111
§ 371 (c)(1),
(2) Date: Oct. 28, 2014

(87) PCT Pub. No.: WO2013/172028
PCT Pub. Date: Nov. 21, 2013

(65) Prior Publication Data
US 2015/0114078 A1    Apr. 30, 2015

(30) Foreign Application Priority Data

May 17, 2012    (JP) .................................. 2012-113257

(51) Int. Cl.
*G01F 25/00*    (2006.01)
*G01F 1/66*    (2006.01)
(Continued)

(52) U.S. Cl.
CPC .......... *G01F 25/0007* (2013.01); *G01F 1/667* (2013.01); *G01F 1/668* (2013.01); *G01F 1/7082* (2013.01); *G01F 15/022* (2013.01)

(58) Field of Classification Search
CPC .... G01F 25/0007; G01F 1/667; G01F 15/022; G01F 1/7082; G01F 1/668
See application file for complete search history.

(56) References Cited

U.S. PATENT DOCUMENTS 5,379,649 A * 1/1995 Kalotay ................ G01F 1/8413
                                                          73/657
5,831,175 A * 11/1998 Fletcher-Haynes ..... G01F 1/667
                                                          73/861.28
(Continued)

FOREIGN PATENT DOCUMENTS

JP        11-304559 A        11/1999
JP        2008-175668 A       7/2008
(Continued)

OTHER PUBLICATIONS

International Search Report, and English language translation thereof, in corresponding International Application No. PCT/JP2013/003111, dated Aug. 6, 2013, 2 pages.
(Continued)

*Primary Examiner* — Justin Seo
*Assistant Examiner* — John M Royston
(74) *Attorney, Agent, or Firm* — Brinks Gilson & Lione (57) ABSTRACT

A flow rate measurement device of the present invention includes a flow rate signal detection unit for detecting a flow rate signal of a fluid to be measured flowing through flow path, flow rate calculation unit for calculating a flow rate from the flow rate signal detected by the flow rate signal detection unit, and oscillation circuit for generating a reference clock. Furthermore, the flow rate measurement device includes temperature calculation unit for calculating a tem-
(Continued)

perature from a frequency change resulting from a temperature change of oscillation circuit, and flow rate correction unit for correcting the flow rate calculated by the flow rate calculation unit by obtaining an offset flow rate at a desired temperature based on the temperature calculated by temperature calculation unit. Thus, accuracy of flow rate measurement can be improved.

4 Claims, 10 Drawing Sheets

(51) Int. Cl.
    *G01F 1/708*     (2006.01)
    *G01F 15/02*     (2006.01)

(56) References Cited

U.S. PATENT DOCUMENTS

| | | | |
|---|---|---|---|
| 6,796,189 B1 * | 9/2004 | Umekage | G01F 1/66 73/861.27 |
| 2002/0078760 A1 | 6/2002 | Matsushima et al. | |
| 2002/0143480 A1 | 10/2002 | Komatsu et al. | |
| 2005/0288873 A1 * | 12/2005 | Urdaneta | G01F 1/66 137/487.5 |
| 2008/0211510 A1 * | 9/2008 | Zolock | G01F 1/6847 324/451 |
| 2011/0246098 A1 * | 10/2011 | Takemura | G01F 1/667 702/48 |
| 2013/0081477 A1 * | 4/2013 | Gotou | G01F 1/667 73/861.02 |
| 2013/0091958 A1 | 4/2013 | Satou et al. | |
| 2013/0333441 A1 * | 12/2013 | Smith | G01N 29/07 73/1.82 |

FOREIGN PATENT DOCUMENTS

| | | |
|---|---|---|
| JP | 2011-64517 A | 3/2011 |
| JP | 2012-7977 A | 1/2012 |
| JP | 2012-13602 A | 1/2012 |

OTHER PUBLICATIONS

Supplementary European Search Report in European Application No. 13 79 1373, dated Jun. 5, 2015, 6 pages.

English language translation of Search Report in corresponding Chinese Application Serial No. 201380025783.2, dated Nov. 4, 2016, 3 pages.

* cited by examiner

FLOW RATE MEASUREMENT DEVICE

This application is a 371 application of PCT/JP2013/003111 having an international filing date of May 16, 2013, which claims priority to JP2012-113257 filed May 17, 2012, the entire contents of which are incorporated herein by reference.

TECHNICAL FIELD

The present invention relates to a flow rate measurement device for measuring a flow rate of a fluid to be measured, for example, gas, water, and the like, by using time measurement.

BACKGROUND ART

Figure 9:
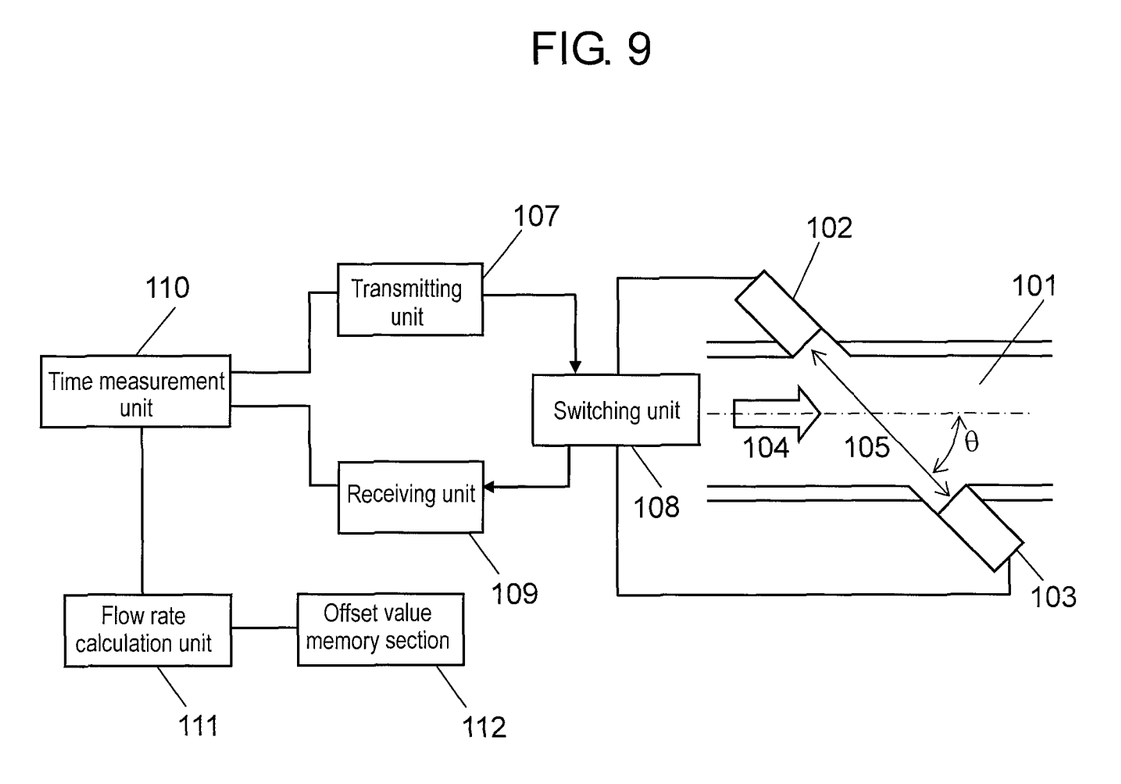
FIG. 9 is a block diagram of a conventional flow rate measurement device.

Conventionally, as a fluid flow rate measurement device of this type, a flow rate measurement device described with reference to FIG. 9 is generally known (see, for example, Patent Literature 1). FIG. 9 is a block diagram of a conventional flow rate measurement device.

As shown in FIG. 9, a conventional flow rate measurement device includes first oscillator 102 and second oscillator 103 provided at an upstream side and a downstream side of flow path 101, respectively, in such a manner that they face each other. At this time, void arrow 104 in flow path 101 shows a flow direction of a fluid flowing in flow path 101. First oscillator 102 and second oscillator 103 are disposed such that propagation path 105 of an ultrasonic wave transmitted and received by first oscillator 102 and second oscillator 103 intersects at angle θ with the flow direction of the fluid in flow path 101 shown by alternate long and short dashed lines.

Hereinafter, an operation for measuring a flow rate of a fluid by using a conventional flow rate measurement device is described with reference to FIG. 9.

Firstly, as shown in FIG. 9, a transmitted signal is transferred from transmitting unit 107 to first oscillator 102 at the upstream side through switching unit 108. First oscillator 102 is driven by the transmitted signal, and an ultrasonic wave based on the transmitted signal is transmitted into flow path 101.

Then, the ultrasonic wave that propagates through flow path 101 is received by second oscillator 103 provided at the downstream side. A received ultrasonic wave signal is transferred to receiving unit 109 through switching unit 108. At this time, time measurement unit 110 measures time during which the ultrasonic wave is transmitted from first oscillator 102 and received by second oscillator 103.

Next, a transmitted signal is transferred from transmitting unit 107 to second oscillator 103 at the downstream side through switching unit 108. Second oscillator 103 is driven by the transmitted signal, and an ultrasonic wave based on the transmitted signal is transmitted into flow path 101.

Then, the ultrasonic wave that propagates through flow path 101 is received by first oscillator 102 provided at the upstream side. A received ultrasonic wave signal is transferred to receiving unit 109 through switching unit 108. At this time, as mentioned above, time measurement unit 110 measures time during which the ultrasonic wave is transmitted from second oscillator 103 and received by first oscillator 102.

Note here that in order to increase time resolution, a so-called sing-around measurement method is used. In the sing-around measurement method, an operation of transferring the ultrasonic wave signal received by receiving unit 109 to transmitting unit 107 via time measurement unit 110 is repeated, for example, twice to 256 times. At this time, time measurement unit 110 measures a repeated number and total time of the operation of transferring the ultrasonic wave signal from receiving unit 109 to transmitting unit 107.

Hereinafter, a general method for calculating the flow rate and the flow velocity of a fluid to be measured by using a flow rate measurement device is described specifically.

Note here that effective length between first oscillator 102 and second oscillator 103 is denoted by L, a flow velocity of a fluid is denoted by V, a sound velocity of an ultrasonic wave propagating in the fluid is denoted by C, an intersection angle made by a flow direction of the fluid and a propagation direction of the ultrasonic wave is denoted by θ.

At this time, propagation time Ta of the ultrasonic wave from first oscillator 102 at the upstream side to second oscillator 103 at the downstream side and propagation time Tb of the ultrasonic wave from second oscillator 103 at the downstream side to first oscillator 102 at the upstream side are represented as follows.

$$Ta = L/(C + V \cos \theta) \quad (1)$$

$$Tb = L/(C - V \cos \theta) \quad (2)$$

Then, mathematical formulae (1) and (2) are deformed, the following mathematical formulae are obtained:

$$C + V \cos \theta = L/Ta \quad (3)$$

$$C - V \cos \theta = L/Tb \quad (4)$$

Furthermore, when an addition of formulae (3) and (4) is carried out, the following mathematical formula is obtained:

$$2 \times C = L(1/Ta + 1/Tb)$$

Thus, sound velocity C of the ultrasonic wave can be calculated as shown in the mathematical formula (5):

$$C = (L/2) \times (1/Ta + 1/Tb) \quad (5)$$

Furthermore, flow velocity V of the fluid is obtained as follows. When mathematical formula (4) is subtracted from mathematical formula (3), $$2 \times V \cos(\theta) = L(1/Ta - 1/Tb)$$

is obtained. Thus, flow velocity V of the fluid can be obtained from the following mathematical formula (6):

$$V = L/2 \times \cos \theta \times (1/Ta - 1/Tb) \quad (6)$$

Herein, effective length L between an ultrasonic wave transmitter/receiver composed of first oscillator 102 and second oscillator 103, and intersection angle θ are previously determined constant numbers.

Therefore, when propagation time Ta and propagation time Tb of the ultrasonic wave are measured by using time measurement unit 110, flow velocity V of the fluid can be obtained from mathematical formula (6).

Furthermore, when a previously determined sectional area of flow path 101 is multiplied, flow rate Q of the fluid can be obtained.

The above-described calculation processing is executed in flow rate calculation unit 111 shown in FIG. 9, flow velocity V of the fluid and flow rate Q of the fluid can be calculated.

Hereinafter, a general measurement method of propagation time of an ultrasonic wave signal in a conventional flow rate measurement device is described by using FIG. 10.

Figure 10:
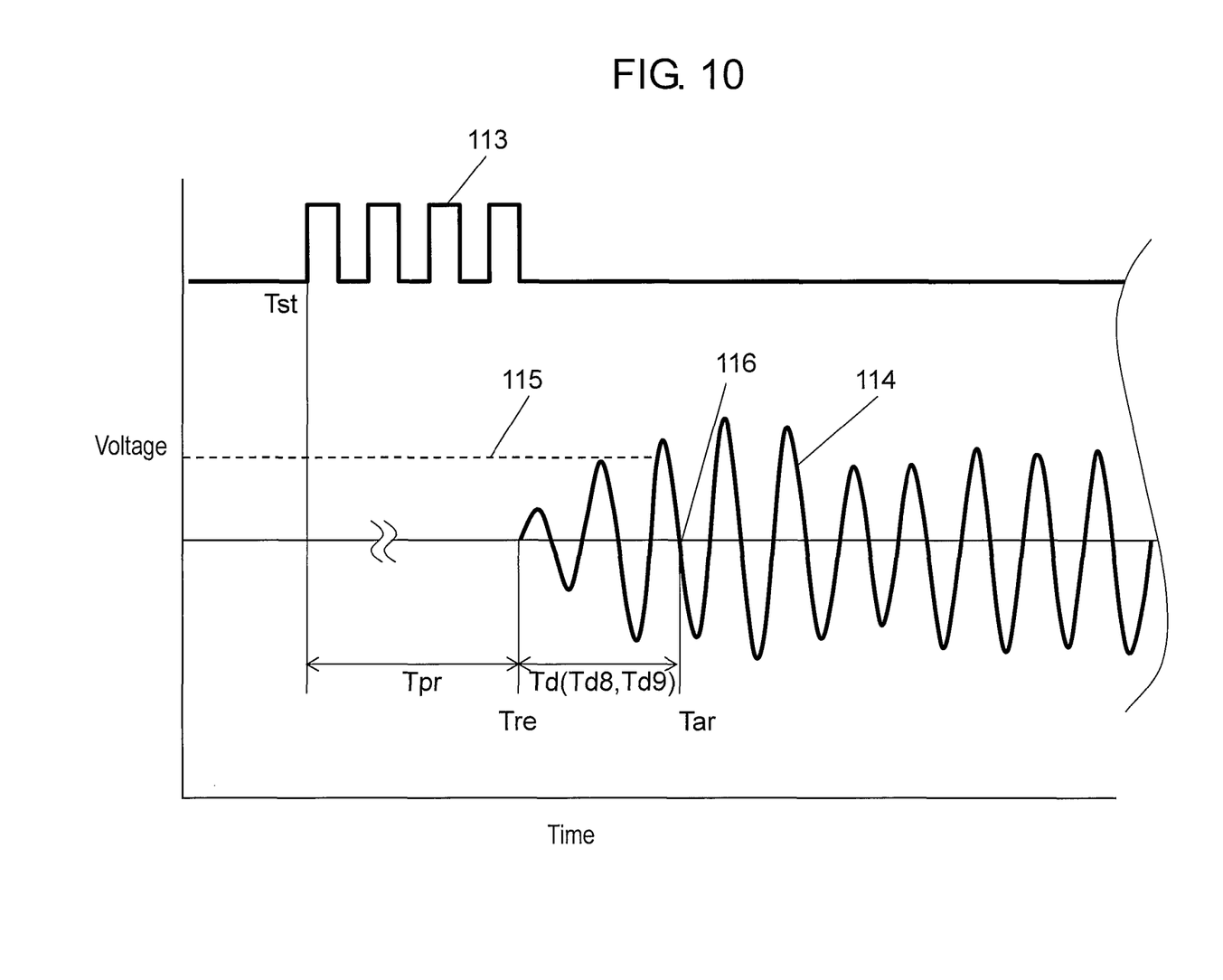
FIG. 10 is a timing chart showing a received wave of a conventional flow rate measurement device.

FIG. 10 is a timing chart showing a received wave of a conventional flow rate measurement device.

Note here that FIG. 10 shows signal waveforms transmitted or received by first oscillator 102 and second oscillator 103. Rectangular wave 113 in FIG. 10 shows a transmitted signal applied to first oscillator 102 or second oscillator 103 as a voltage value. Furthermore, received signal 114 having a sinusoidal waveform in FIG. 10 shows received signal 114 received in first oscillator 102 or second oscillator 103 and amplified as a voltage value.

At this time, as shown in FIG. 10, in general, as a receiving point of the time measurement, zero crossing point 116 after received signal 114 having a sinusoidal waveform exceeds a predetermined threshold voltage value shown by broken line 115 is used in many cases.

In other words, a rise time point of rectangular wave 113 of a transmitted signal shown in FIG. 10 is time Tst, that is, transmission start time, and zero crossing point 116 is time Tar, that is, receiving time.

Therefore, propagation time Ta, Tb of received signal 114 that is a measured ultrasonic wave signal is time between time Tar and time Tst, that is, Ta, Tb=Tar−Tst.

However, as is apparent from received signal 114 of FIG. 10, the time at which the propagating ultrasonic wave is received by first oscillator 102 or second oscillator 103 is exactly time Tre that is a lead of received signal 114. In other words, time delay Td between time Tre and time Tar shown in FIG. 10 can be regarded as time delay Td in which the ultrasonic wave reaches first oscillator 102 or second oscillator 103 at a receiving side, and then is received by receiving unit 109.

At this time, time delay Td is largely dependent upon each property of first oscillator 102 or second oscillator 103. Therefore, propagation time Ta of the ultrasonic wave from first oscillator 102 at the upstream side to second oscillator 103 at the downstream side includes time delay (referred to as "Td9") which is determined by the property of second oscillator 103 at the downstream side, that is, an ultrasonic wave transmitter/receiver at the receiving side. Furthermore, propagation time Tb of the ultrasonic wave from second oscillator 103 at the downstream side to first oscillator 102 at the upstream side includes time delay (referred to as "Td8") which is determined by the property of first oscillator 102 at the upstream side, that is, an ultrasonic wave transmitter/receiver at the receiving side. FIG. 10 shows that time delay Td9 of second oscillator 103 and time delay Td8 of first oscillator 102 are the same as each other. However, in general, these time delays are different depending upon the property of first oscillator 102 or second oscillator 103.

Thus, in a conventional flow rate measurement device, as shown in FIG. 9, inherent time delay Td8 and time delay Td9 which are determined by the property of ultrasonic wave transmitters/receivers such as first oscillator 102 or second oscillator 103 are stored as offset values in offset value memory section 112. Then, at the time of calculation of the flow rate by flow rate calculation unit 111 as described above, subtraction processing is carried out by subtracting each of offset value Td8 and offset value Td9 from each of propagation time Ta and propagation time Tb of the ultrasonic wave measured in first oscillator 102 or second oscillator 103. Thus, more accurate propagation time (Tpr) of the ultrasonic wave is obtained. As a result, a more accurate flow rate value of a fluid to be measured can be calculated.

Specifically, the offset values at the upstream and downstream sides are defined as time that is 2.5 times as long as the period of the received waveform received by first oscillator 102 and second oscillator 103. Then, the offset value of the ultrasonic wave transmitter/receiver at the receiving side is subtracted from the measured propagation time of the ultrasonic wave. Thus, a flow rate value of the fluid to be measured can be calculated with high accuracy, and a highly accurate flow rate measurement device can be achieved.

However, when an offset value generated from the property of each of first oscillator 102 and second oscillator 103 is previously set, and correction of the flow rate measurement is carried out, the correction cannot be carried out if a temperature change occurs. That is to say, in a conventional flow rate measurement device, when a slight temperature change occurs, a temperature offset according to the temperature change, which includes an electronic circuit at a receiving side, cannot be corrected.

CITATION LIST

Patent Literature

PTL 1: Japanese Patent Unexamined Publication No. H11-304559

SUMMARY OF THE INVENTION

In order to solve the above-mentioned problems, a flow rate measurement device of the present invention includes a flow rate signal detection unit for detecting a flow rate signal of a fluid to be measured flowing through a flow path, a flow rate calculation unit for calculating a flow rate from the flow rate signal detected by the flow rate signal detection unit, and an oscillation circuit for generating a reference clock. Furthermore, the flow rate measurement device includes a temperature calculation unit for calculating a temperature from a frequency change resulting from a temperature change of the oscillation circuit, and a flow rate correction unit for correcting the flow rate calculated by the flow rate calculation unit by obtaining an offset flow rate at a desired temperature based on the temperature calculated by the temperature calculation unit.

Thus, the calculated flow rate can be corrected by an offset flow rate at a desired temperature. As a result, a flow rate measurement device having improved measurement accuracy of a flow rate can be achieved.

Furthermore, the flow rate measurement device of the present invention includes a pair of oscillators which are provided in a flow path through which a fluid to be measured flows, and which transmit and receive an ultrasonic wave signal; a transmitting unit for driving a first oscillator of the pair of oscillators; a receiving unit for receiving the ultrasonic wave signal from a second oscillator of the pair of oscillators; a time measurement unit for measuring propagation time between transmission and reception of the ultrasonic wave signal; a flow rate calculation unit which measures a flow velocity of the fluid to be measured from the propagation time measured by the time measurement unit, and calculates a flow rate from the flow velocity. Furthermore, the flow rate measurement device includes an oscillation circuit for generating a reference clock for measuring the propagation time; a temperature calculation unit for calculating a temperature from a frequency change resulting from a temperature change of the oscillation circuit; and a flow rate correction unit for correcting the flow rate calculated by the flow rate calculation unit by obtaining an offset flow rate at a desired temperature based on the temperature calculated by the temperature calculation unit.

This makes it possible to achieve a flow rate measurement device having high precision which is not affected by a temperature change or the like.

DETAILED DESCRIPTION OF THE PREFERRED EMBODIMENTS

Hereinafter, the exemplary embodiment of the present invention is described with reference to drawings. Note here that this exemplary embodiment is not construed to limit the present invention.

Exemplary Embodiment

Hereinafter, a flow rate measurement device in accordance with an exemplary embodiment of the present invention is described by using FIG. 1.

Figure 1:
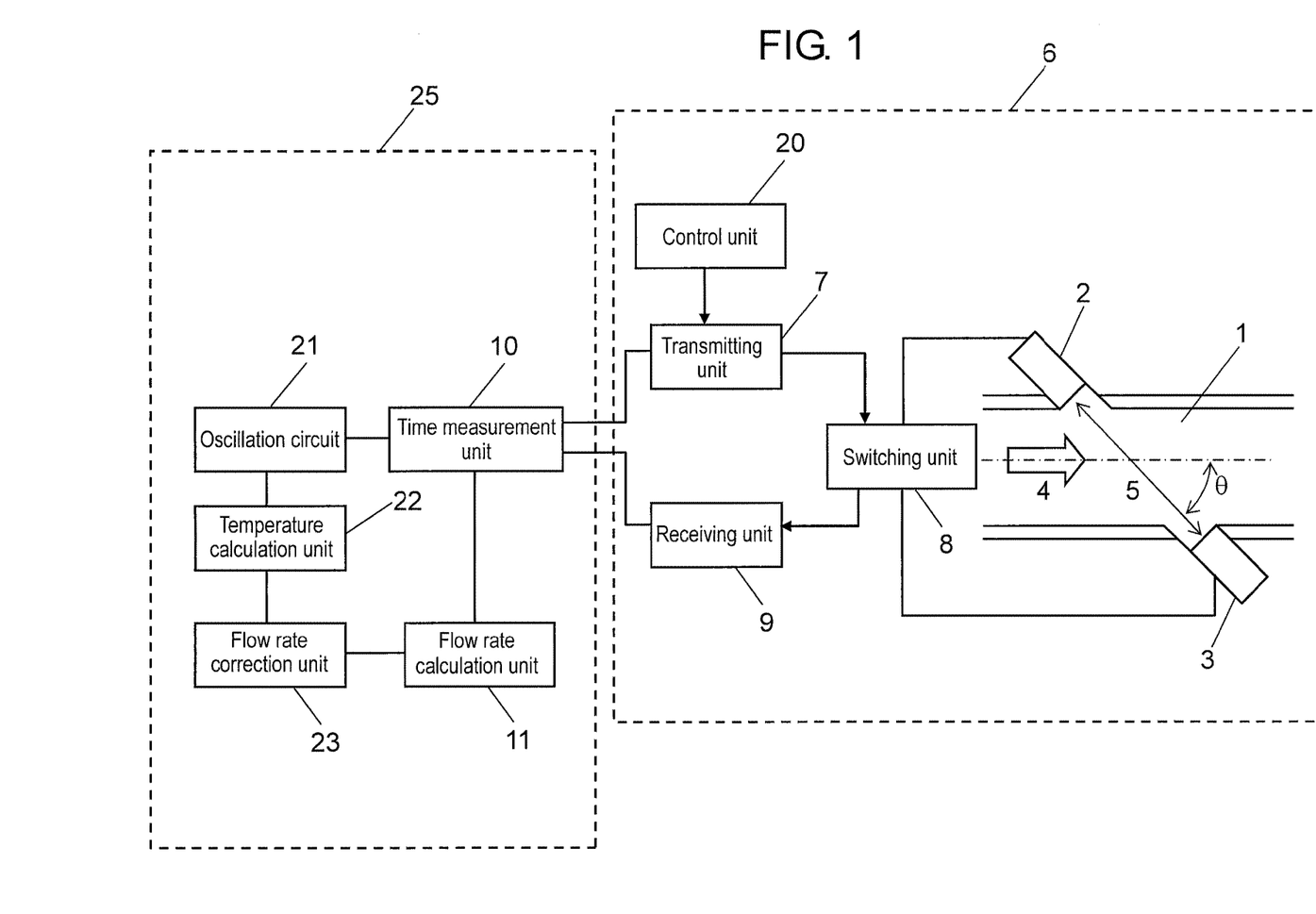
FIG. 1 is a block diagram of a flow rate measurement device in accordance with an exemplary embodiment of the present invention.

FIG. 1 is a block diagram of a flow rate measurement device in accordance with an exemplary embodiment of the present invention.

As shown in FIG. 1, the flow rate measurement device of this exemplary embodiment includes at least measurement device 6 and measurement calculation device 25.

Measurement device 6 of the flow rate measurement device includes a pair of oscillators composed of first oscillator 2 and second oscillator 3 for transmitting and receiving an ultrasonic wave, which are provided in the middle of flow path 1, transmitting unit 7, switching unit 8, receiving unit 9, and control unit 20, constituting a flow rate signal detection unit. At this time, for example, first oscillator 2 at one side is disposed at an upstream side of flow path 1 and second oscillator 3 at the other side is disposed at a downstream side of flow path 1, such that first oscillator 2 and second oscillator 3 face each other. Transmitting unit 7 drives first oscillator 2 or second oscillator 3. Receiving unit 9 receives an ultrasonic wave signal from first oscillator 2 or second oscillator 3. Switching unit 8 switches and supplies a drive signal of transmitting unit 7 to first oscillator 2 or second oscillator 3, and switches and supplies an ultrasonic wave signal received by second oscillator 3 or first oscillator 2 to receiving unit 9. Specifically, when switching unit 8 switches and supplies the drive signal of transmitting unit 7 to first oscillator 2, switching unit 8 switches and supplies the ultrasonic wave signal received by second oscillator 3 to receiving unit 9. Note here that void arrow 4 in flow path 1 shows a flow direction of a fluid flowing in flow path 1. First oscillator 2 and second oscillator 3 are disposed such that propagation path 5 of the ultrasonic wave transmitted and received by first oscillator 2 and second oscillator 3 intersects at angle θ with the flow direction of the fluid in flow path 1 shown by the alternate long and short dashed lines.

Furthermore, measurement calculation device 25 of the flow rate measurement device includes at least time measurement unit 10, flow rate calculation unit 11, oscillation circuit 21, temperature calculation unit 22, and flow rate correction unit 23. Time measurement unit 10 measures propagation time of transmission and reception of the ultrasonic wave signal between first oscillator 2 and second oscillator 3. Flow rate calculation unit 11 measures a flow velocity of the fluid from the propagation time measured by time measurement unit 10, and further calculates a flow rate from the flow velocity. Oscillation circuit 21 generates a reference clock to measure the propagation time in time measurement unit 10. Temperature calculation unit 22 obtains a temperature from a frequency change (specifically, a frequency change of an oscillation generator that is a base of the reference clock) resulting from a temperature change in oscillation circuit 21, which is described later in detail. Flow rate correction unit 23 obtains an offset flow rate at a desired temperature from the flow rate calculated by flow rate calculation unit 11 based on the temperature calculated by temperature calculation unit 22, and corrects the flow rate of the measured fluid as the fluid to be measured.

As mentioned above, the flow rate measurement device of this exemplary embodiment is configured.

Hereinafter, a method for obtaining propagation time of an ultrasonic wave by using the flow rate measurement device of this exemplary embodiment, as an example of a general measurement operation of a flow velocity or a flow rate, is described by using FIG. 2 with reference to FIG. 1.

Figure 2:
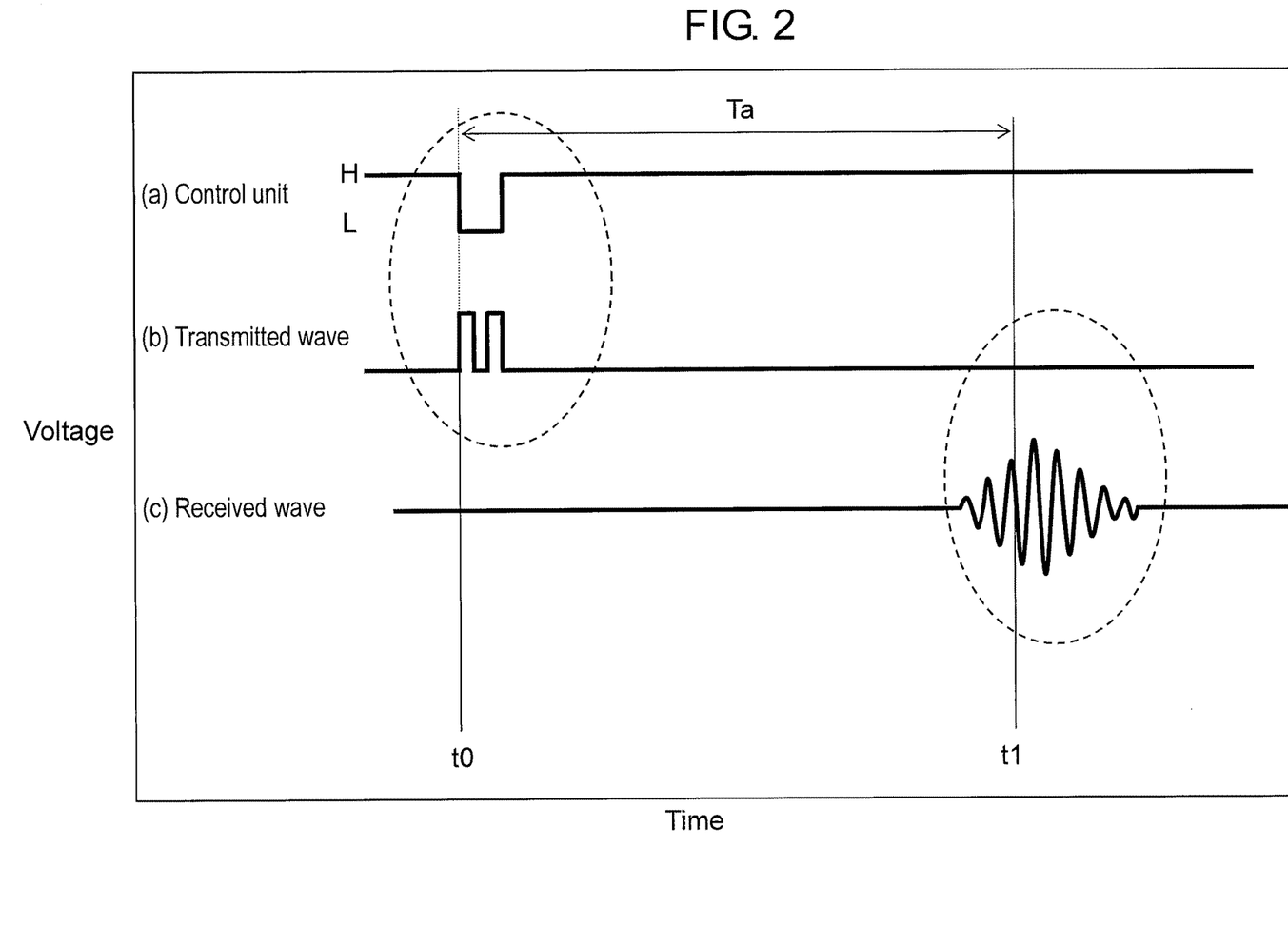
FIG. 2 is a timing chart showing a transmitted wave and a received wave in the flow rate measurement device.

FIG. 2 is a timing chart showing a transmitted wave and a received wave in the flow rate measurement device.

Firstly, as shown in FIG. 2, transmitting unit 7 receives a start signal (a time point at which H (Hi) is changed to L (Low) shown in (a) control unit in FIG. 2) from control unit 20, and pulse-drives first oscillator 2, which is switched by switching unit 8, for a predetermined time (see (b) transmitted wave in FIG. 2). At the same time, time measurement unit 10 starts time measurement by using a reference clock of oscillation circuit 21.

Then, an ultrasonic wave is transmitted from pulse-driven first oscillator 2 into flow path 1. The ultrasonic wave transmitted from first oscillator 2 propagates through the fluid to be measured, and is received by second oscillator 3.

The received signal that is an ultrasonic wave signal received by second oscillator 3 and output from second oscillator 3 is input into receiving unit 9 through switching unit 8. The received signal input into receiving unit 9 is amplified in receiving unit 9. Thereafter, at a time point when the amplified received signal reaches a previously determined signal level at receiving timing, the completion of the receiving operation is determined.

Then, at the time point when the completion of the receiving operation is determined, an operation of time measurement unit 10 is stopped. Specifically, receiving unit 9 generally includes a comparator and the like, compares a voltage value of a predetermined reference voltage and a voltage value of a received signal with each other, and, then, determines the completion of the receiving operation of the ultrasonic wave signal based on the compared results.

Next, a flow velocity is obtained from time information t from a time when an operation of time measurement unit 10 is started until a time when the operation is stopped, by the following mathematical formula (7).

Herein, t denotes measurement time obtained from time measurement unit 10, L denotes effective length between first oscillator 2 and second oscillator 3 in a flow direction, θ denotes an intersection angle made by a flow direction of a fluid and a the propagation direction of an ultrasonic wave, C denotes a sound velocity, and V denotes a flow velocity of a fluid to be measured. Thus, in general, flow velocity V of the fluid to be measured can be obtained from mathematical formula (7).

$$V = (1/\cos \theta) \times (L/t) - C \quad (7)$$

Furthermore, as mentioned above, by switching the transmitting and receiving directions of first oscillator 2 and second oscillator 3, the propagation time from the upstream to the downstream of the fluid to be measured, and the propagation time from the downstream to the upstream of the fluid to be measured are measured. Thus, flow velocity V of the fluid to be measured can be calculated from the following mathematical formulae (8, 9, and 10).

$$t1 = L/(C + V \times \cos \theta) \quad (8)$$

$$t2 = L/(C - V \times \cos \theta) \quad (9)$$

$$V = (L/2 \times \cos \theta) \times (1/t1 - 1/t2) \quad (10)$$

Herein, t1 denotes measurement time from the upstream to the downstream, and t2 denotes measurement time from the downstream to the upstream.

As is apparent from mathematical formula (10), according to the above-mentioned method, it is possible to measure flow velocity V without being influenced by a variation of sound velocity C of the fluid to be measured. Therefore, the method is widely used for measurement of the flow velocity, flow rate, length, or the like.

Furthermore, when flow velocity V of the fluid to be measured is determined from mathematical formula (10), by multiplying a sectional area of flow path 1 by flow velocity V, flow rate Q can be derived.

Figure 3:
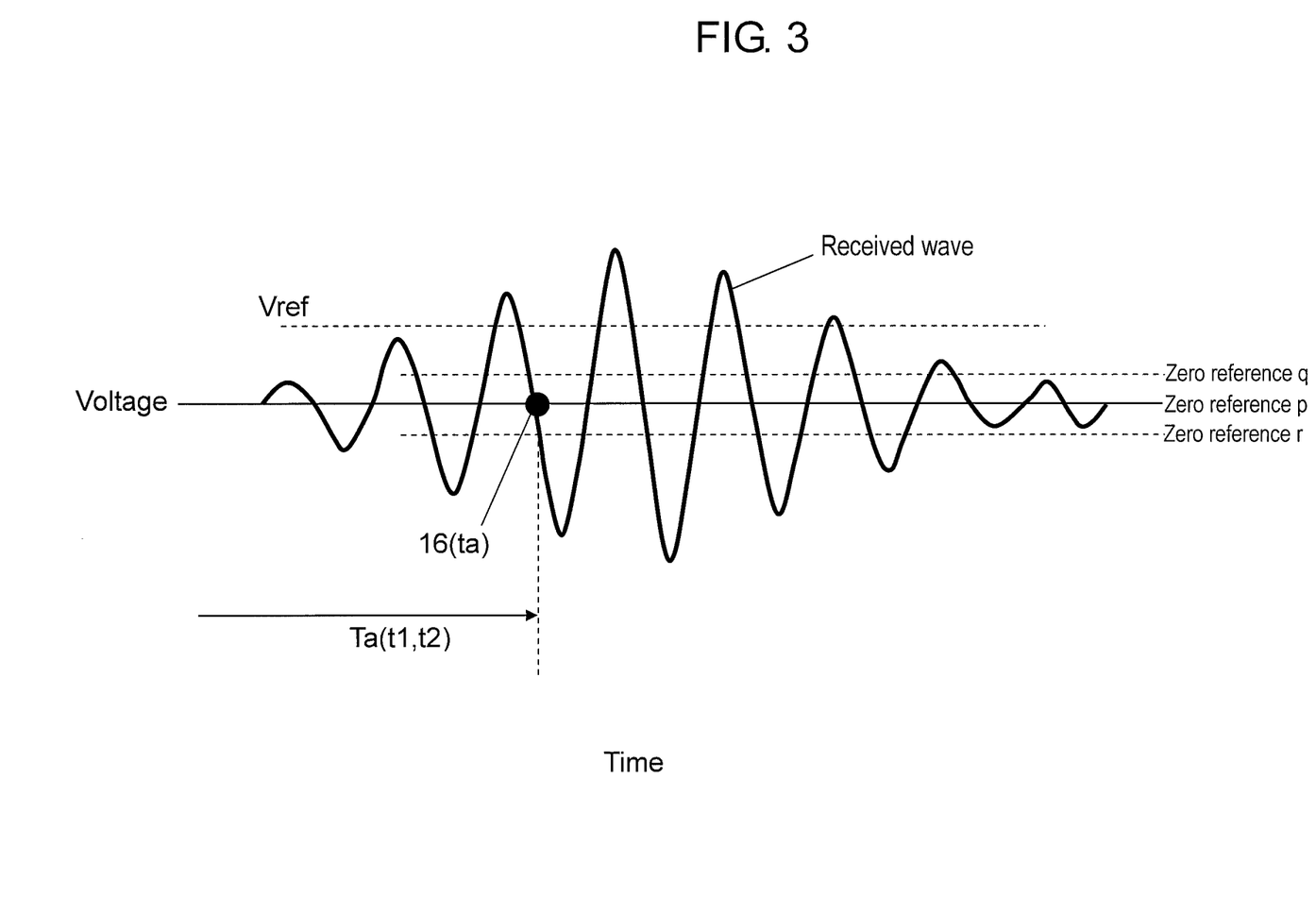
FIG. 3 is a view showing the received wave of the flow rate measurement device.

Hereinafter, a conventional measurement operation of propagation time is described by using FIG. 3 with reference to the timing chart of FIG. 2. FIG. 3 is a view showing the received wave of the flow rate measurement device.

Firstly, measurement of time of an ultrasonic wave signal is started from a start signal at time t0 shown in (a) control unit 20 in FIG. 2. At the same time, a pulse shown in (b) transmitted wave in FIG. 2 is supplied to first oscillator 2 through transmitting unit 7 so as to drive first oscillator 2 and to generate an ultrasonic wave signal.

The ultrasonic wave signal generated in first oscillator 2 propagates through flow path 1, and is detected as a received signal by second oscillator 3 at time t1 shown in (c) received wave in FIG. 2.

Specifically, as shown in FIG. 3, the received signal detected by second oscillator 3 is amplified in receiving unit 9. When a signal level of the amplified received signal, for example, a voltage becomes the threshold value (Vref) or more, it is determined that a received wave reaches. The first zero crossing point 16 after the signal level exceeds the threshold value (Vref) is defined as a receiving point. Then, time t1 until zero crossing point 16 is measured by time measurement unit 10.

Next, switching unit 8 switches transmitting and receiving functions of first oscillator 2 and second oscillator 3, and, then, the same operation is carried out. Then, time t2 until zero crossing point 16 of the received signal detected by first oscillator 2 is measured by time measurement unit 10. Then, based on time t2 measured by time measurement unit 10 and the above-mentioned time t1, flow velocity V and flow rate Q are calculated by flow rate calculation unit 11 using, for example, mathematical formula (10).

Hereinafter, an operation of the reference clock generated in oscillation circuit 21 of the flow rate measurement device of this exemplary embodiment is described by using FIGS. 4 and 5.

Figure 4:
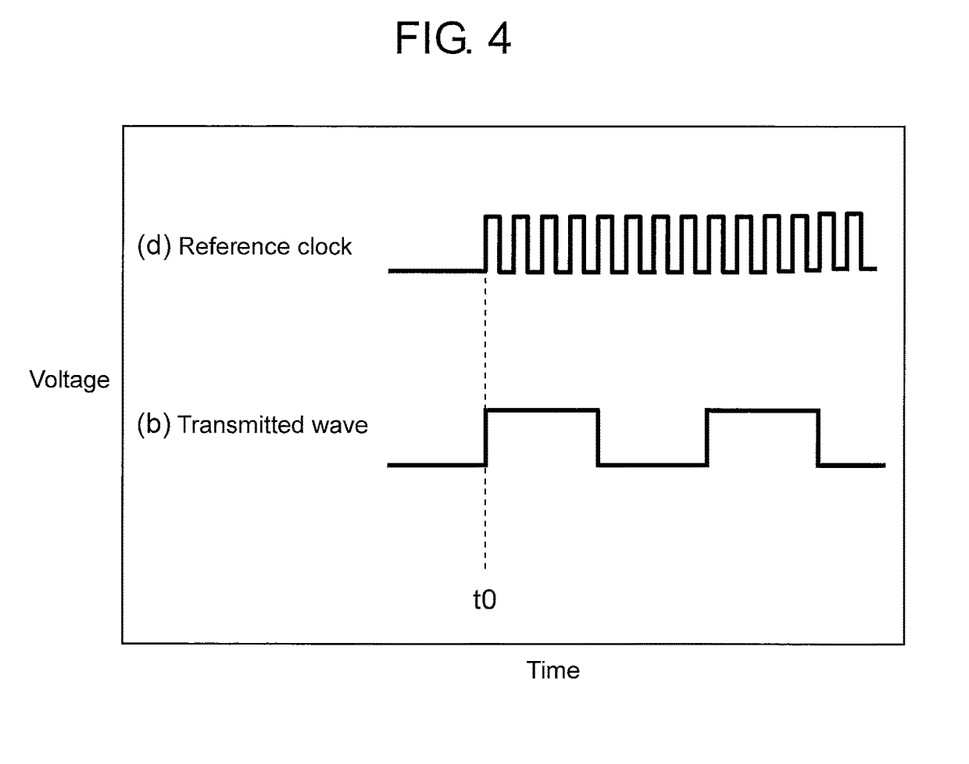
FIG. 4 is a timing chart of a reference clock and the transmitted wave of the flow rate measurement device.

FIG. 4 is a timing chart of the reference clock and the transmitted wave of the flow rate measurement device. FIG. 5 is a timing chart of the reference clock and the received wave of the flow rate measurement device. Note here that FIG. 5 is an enlarged view showing the vicinity of time t1 of FIG. 2.

Firstly, as shown in (b) transmitted wave in FIG. 4, oscillation circuit 21 operates as shown in (d) reference clock in FIG. 4 at time t0 of a drive signal (transmitted wave) to first oscillator 2 or second oscillator 3. Thus, a clock waveform of the reference clock as a reference for measuring the propagation time is generated.

Figure 5:
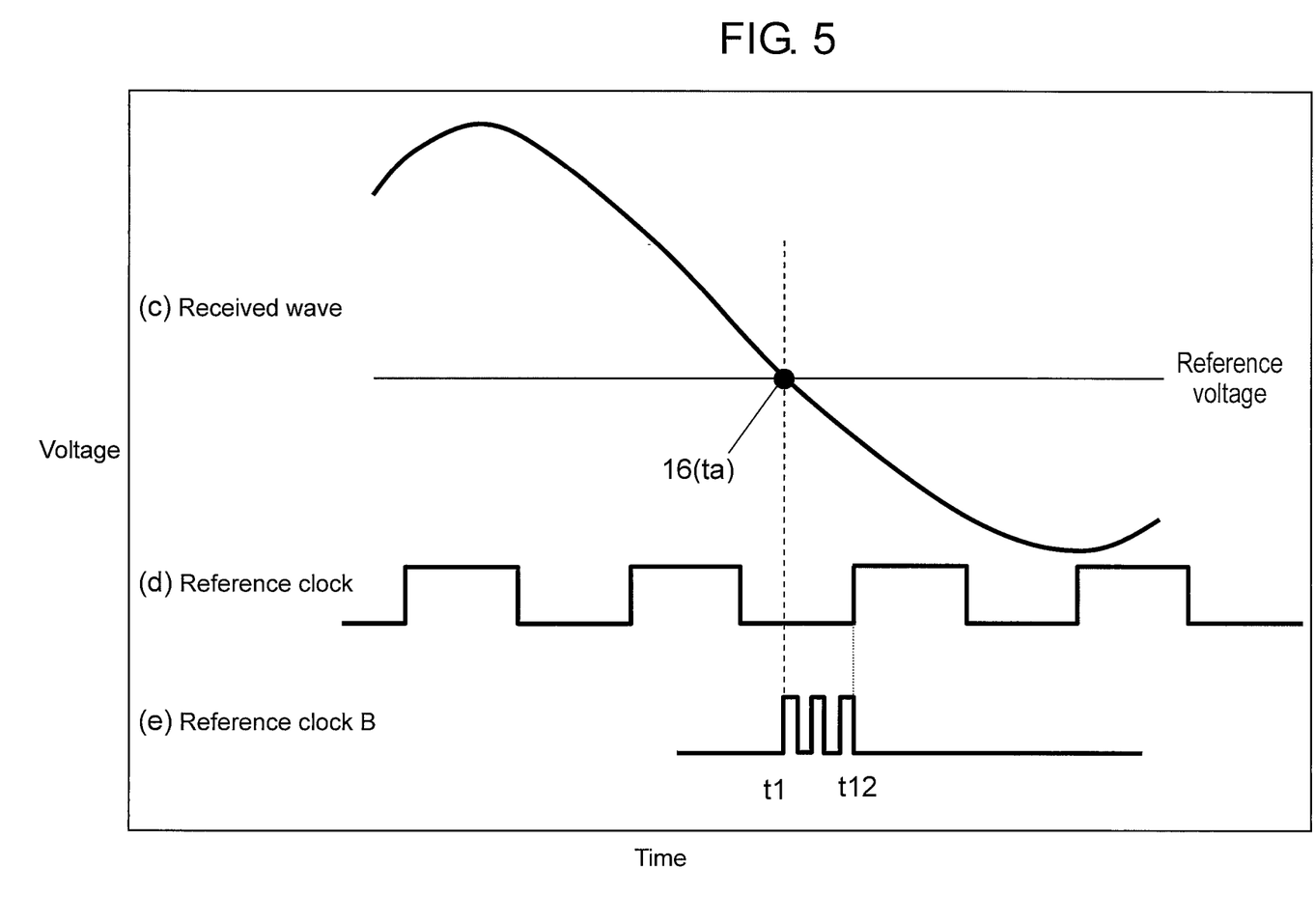
FIG. 5 is a timing chart of a reference clock and the received wave of the flow rate measurement device.

Then, a point at which the received wave as the received signal that has been input into receiving unit 9 passes through a zero point as the reference voltage, that is, when the received signal reaches zero crossing point 16, shown in (c) received wave in FIG. 5, is defined as receiving point ta. At this time, time measurement unit 10 measures, as propagation time, a time from time t0 at which a transmitted wave is started to be output to time t1 of receiving point ta, based on the reference clock shown in (d) reference clock in FIG. 5. However, as shown in (d) reference clock in FIG. 5, error in time which is half wavelength at maximum of the reference clock is generated in the propagation time. Therefore, in order to reduce the error, it is necessary to increase the resolution of the reference clock.

However, when oscillation circuit 21 is allowed to oscillate at high speed in order to increase the resolution of the reference clock, much electric power is needed. Therefore, it is difficult to employ this method of allowing oscillation circuit 21 to oscillate at high speed in devices such as a flow rate measurement device operating with a battery, for example, a gas meter.

Thus, in the flow rate measurement device of this exemplary embodiment, highly accurate time measurement is carried out by using, as the reference clock, reference clock B basically oscillating in several MHz, that is, an operation frequency of microcomputer or the like used by control unit 20, and operating at high speed in the vicinity of only receiving point ta shown in (e) reference clock B of FIG. 5.

Hereinafter, a method for carrying out time measurement with high accuracy by using reference clock B is described with reference to FIG. 5.

Firstly, the number of clocks of the reference clock shown in (d) reference clock of FIG. 5, which continuously operates from time t0 at which a transmitted wave is started to be output to time t1 of receiving point ta, is counted. At this time, when the received wave passes through zero crossing point 16 as shown in (e) reference clock B of FIG. 5, pulse of reference clock B operating at higher speed than the reference clock is generated by operating, for example, a ring oscillator described later. Then, time from time t1 at receiving point ta to the next rise time t12 of the reference clock is measured as the number of pulses of reference clock B.

Next, propagation time is obtained by subtracting the time counted by the number of clocks of reference clock B between time t1 and time t12 from the time counted by the number of clocks of the reference clock to time t12. Thus, the propagation time can be measured with high accuracy and reduced electric power.

In this case, reference clock B needs to start oscillation at a time point of time t1. Therefore, since an oscillation circuit such as a usual quartz oscillator has a slow rising, it is difficult to employ the oscillation circuit as an element for generating reference clock B. Furthermore, it is necessary to start oscillation of reference clock B asynchronously. Thus, the flow rate measurement device of this exemplary embodiment carries out measurement by using, for example, a ring oscillator as the oscillation circuit of reference clock B.

However, an oscillation circuit, for example, a ring oscillator, which is implemented by the semiconductor shows temperature dependence property. Therefore, it is difficult to allow the oscillation frequency of, for example, a ring oscillator, to be constant in the range of the operation temperature of a flow rate measurement device.

Figure 6:
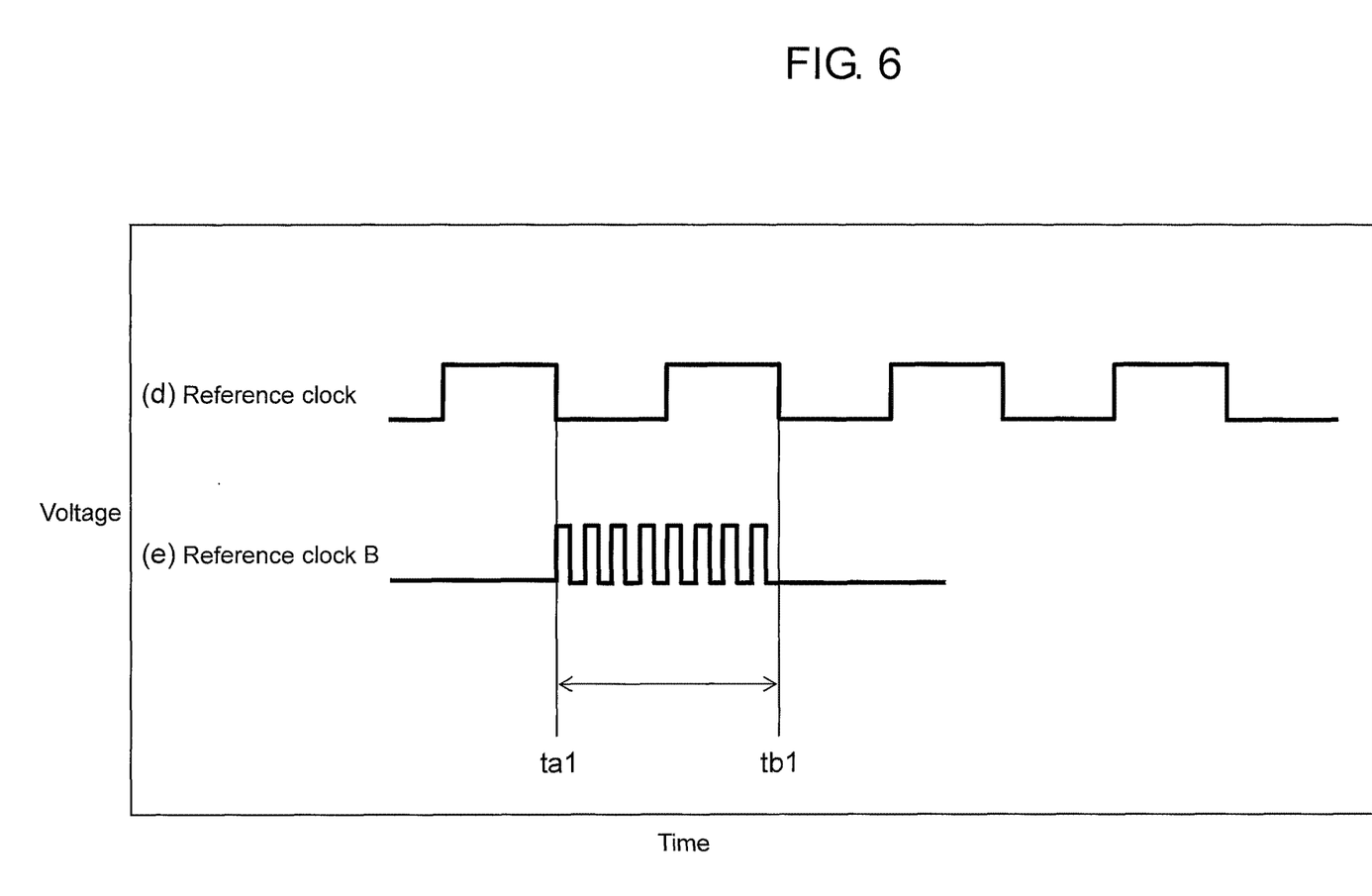
FIG. 6 is a timing chart showing operations of the reference clock and reference clock B in the flow rate measurement device.

Oscillation circuit 21 of this exemplary embodiment uses a reference clock shown in (d) reference clock in FIG. 6, which includes, for example, a quartz oscillator having low temperature dependence property. Then, the number of counts of reference clock B in a unit period is regularly measured based on the unit period of the reference clock (for example, one period from ta1 to tb1). In other words, the oscillation frequency, that is, a pulse width of reference clock B is measured. This make it possible to accurately understand the time interval of one pulse.

Furthermore, when the oscillation frequency of the ring oscillator is regularly measured, by using temperature dependence property of the ring oscillator, a temperature of a measurement circuit including a ring oscillator can be calculated by temperature calculation unit 22.

Hereinafter, a method for detecting a temperature by using temperature dependence property of a ring oscillator is specifically described by using FIG. 7.

Figure 7:
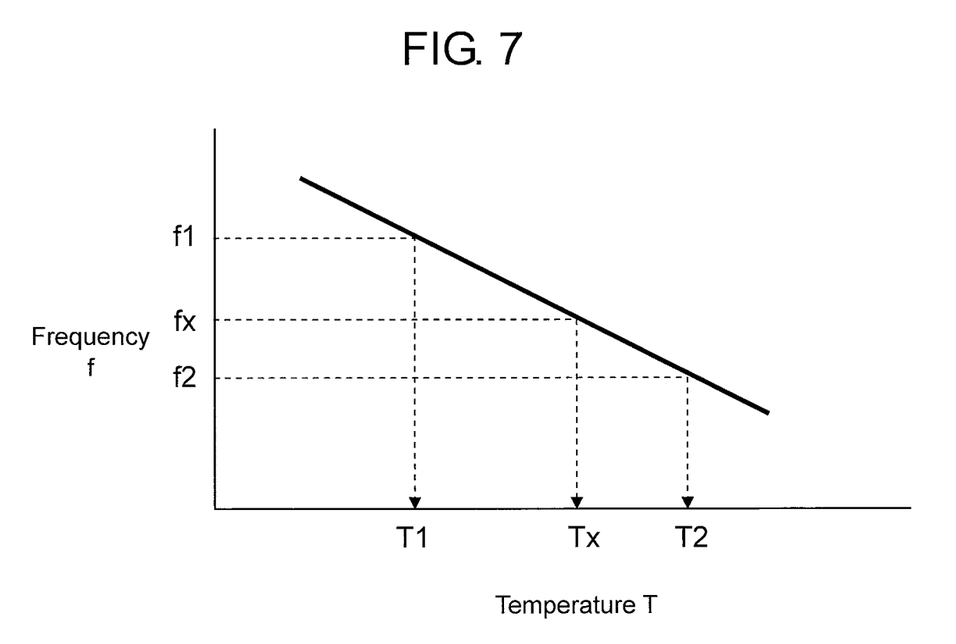
FIG. 7 is a graph showing relation between a frequency of reference clock B and a temperature in the flow rate measurement device.

FIG. 7 is a graph showing relation between a frequency of reference clock B and a temperature in the flow rate measurement device.

As shown in FIG. 7, in general, an oscillation operation inside a semiconductor, for example, a ring oscillator, has temperature dependence property. Thus, when the oscillation frequency of the ring oscillator, that is, the frequency of reference clock B is measured by the method described in FIG. 6, a temperature can be calculated from the frequency change.

For example, as shown in FIG. 7, T1 is previously defined as a temperature when the oscillation frequency of reference clock B is f1, and T2 is previously defined as a temperature when the oscillation frequency of reference clock B is f2. Thus, temperature Tx in arbitrary oscillation frequency fx can be estimated by using, for example, interpolation. Similarly, also in the oscillation frequency higher than f1 or oscillation frequency lower than f2, a temperatures can be estimated by using, for example, extrapolation.

Note here that the relation between the oscillation frequency and the temperature may be obtained in advance when, for example, a semiconductor including a ring oscillator is checked, and may be stored in a nonvolatile memory section such as EPROM. Thus, a temperature can be obtained by reading out the oscillation frequency of reference clock B from the memory section without measuring them regularly. As a result, calculation of temperature calculation unit 22 can be facilitated.

From the above, a temperature can be obtained easily and accurately in temperature calculation unit 22 by using temperature characteristics of oscillation circuit 21.

Hereinafter, a method for correcting an offset flow rate by using the obtained temperature is described by using FIG. 8.

Figure 8:
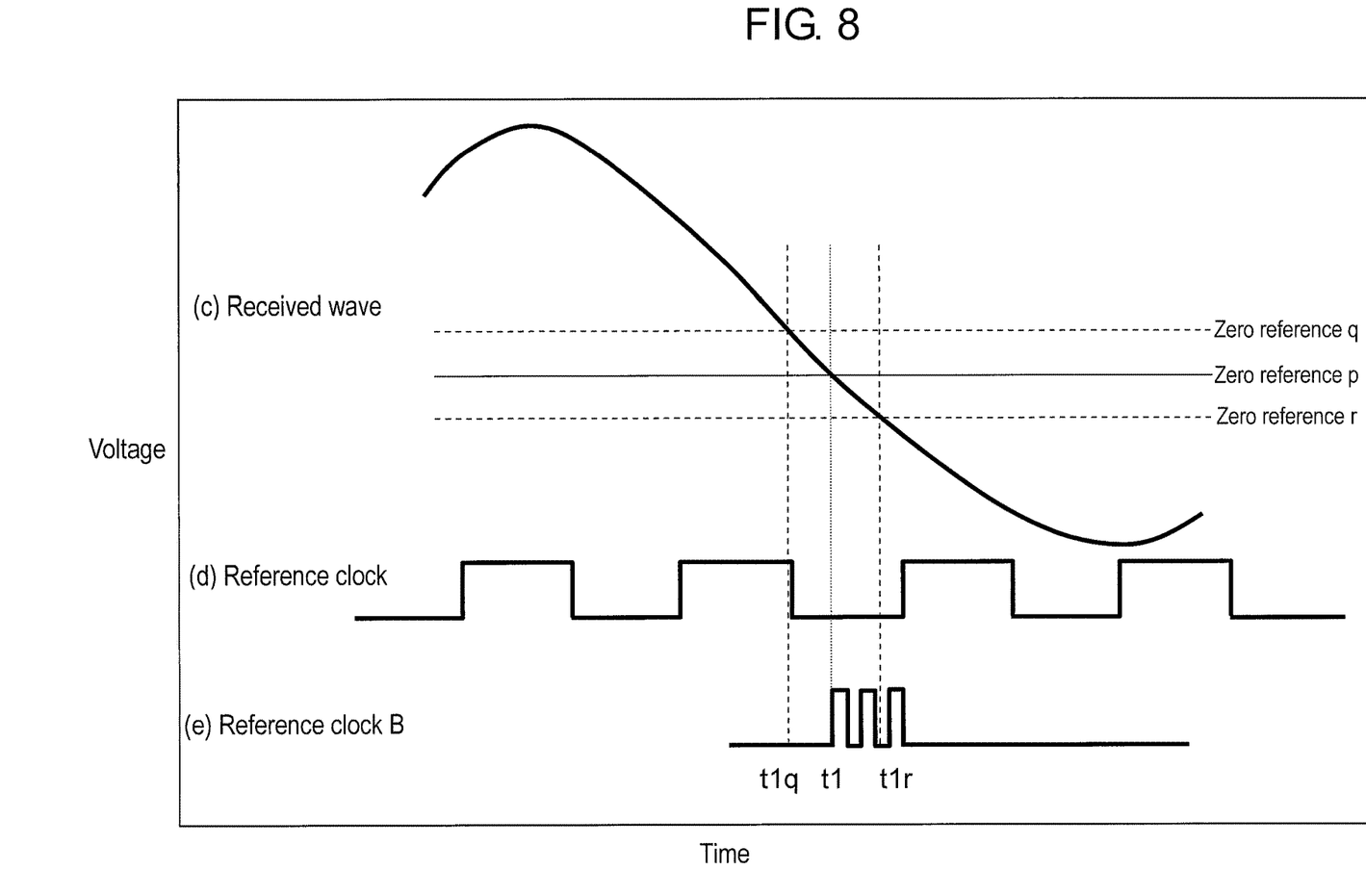
FIG. 8 is a timing chart for illustrating correction of the offset flow rate in the flow rate measurement device.

FIG. 8 is a timing chart for illustrating correction of an offset flow rate in the flow rate measurement device.

In other words, as mentioned above, a semiconductor such as a ring oscillator to be used as reference clock B oscillating at high speed has temperature dependence property. Similarly, an electronic circuit constituting measurement calculation device 25 or the like also has temperature dependence property. Therefore, a reference voltage as a zero point for detecting a zero crossing point also changes depending upon temperatures.

For example, when a reference voltage at a temperature of 25° C. usually called room temperature shown in (c) received wave in FIG. 8 is zero reference p, a reference voltage changes to zero reference q depending upon electronic circuits, for example, at temperatures lower than room temperature. Therefore, time passing through the zero crossing point, that is, propagation time is time t1 q that is earlier than time t1 at room temperature. On the other hand, for example, at temperatures higher than room temperature, the reference voltage changes to zero reference r. Therefore, time passing through the zero crossing point, that is, propagation time is time t1r that is later than time t1 at room temperature.

Furthermore, in the property of the zero crossing point, the temperature characteristics by a path from transmitting unit 7 to receiving unit 9 is different between a case where first oscillator 2 at the upstream side is the transmission side and a case where second oscillator 3 at the downstream side is the transmission side. At this time, not only the zero reference but also the propagation time itself becomes different. In other words, when the propagation time is different, as mentioned above, an offset flow rate is generated in a flow rate in calculation of the flow rate.

Thus, the above-mentioned offset flow rate is corrected by flow rate correction unit 23 by using the temperature calculated by temperature calculation unit 22 and the flow rate calculated by flow rate calculation unit 11. Thus, the flow rate can be obtained more accurately by returning the corrected flow rate to flow rate calculation unit 11.

For example, a temperature of a gas meter may be increased to about 50° C. when the gas meter receives direct sunlight in the daytime. Then, in the daytime, the temperature of the gas meter is substantially constant at an increased temperature. On the other hand, the temperature is decreased to about 10° C. in the nighttime, and to −10° C. or lower in winter in cold districts. As in daytime, the temperature is substantially constant.

Furthermore, in the above-mentioned time zone, gas is not usually used in many cases. Therefore, a gas flow rate detected by the flow rate measurement device continues to be zero in many cases. Thus, when the flow rate calculated by flow rate calculation unit 11 continues to be a value not zero although the use of gas is zero in the above-mentioned time zone, the actual flow rate is regarded as zero. Then, the measured value of the flow rate, not zero, is stored as an offset flow rate, which is generated in measurement devices such as first and second oscillators and a circuit constituting the measurement calculation device, in flow rate correction unit 23 together with temperatures at that time. Thus, temperatures and offset flow rates at two points, that is, at high temperature time in the daytime and at low temperature time in the nighttime are stored.

On the other hand, an offset flow rate at temperatures other than the high temperature in the daytime and the low temperatures in the nighttime can be corrected by estimating an offset flow rate by, for example, interpolation between two points, i.e., the flow rate at high temperature time and at low temperature time, by using temperatures calculated by temperature calculation unit 22 using reference clock B of oscillation circuit 21 as mentioned above. At this time, measurement of temperatures can be carried out by regularly measuring frequency shown in FIG. 6 during measurement of the propagation time. Therefore, temperatures at the substantially same time can be obtained.

Note here that time during which the zero flow rate continues is different dependent upon users. Thus, when a constant flow rate successively and continuously flows at a predetermined flow rate or less as in the above-mentioned daytime or nighttime, it is determined that the offset flow rate component is included. Then, the temperature and the offset flow rate are stored in a correction learning unit of flow rate correction unit 23 for learning. Specifically, the correction learning unit stores the relation between the temperatures and the offset flow rates at least at two temperatures such as a temperature in the daytime and a temperature in the nighttime.

Thus, the offset flow rate at the zero flow rate is corrected by temperature, and highly accurate flow rate calculation can be achieved.

Note here that the offset flow rates at not only temperatures at two points of high temperature time and low temperature time but also at temperatures at three points further including a point of room temperature may be stored by measuring in advance in a manufacturing process of a flow rate measurement device or a manufacturing process of a measurement unit (for example, a circuit board). Thus, since the temperatures of the measurement unit can be stored in a state in which they are managed, the temperatures can be stored more accurately than in the case where temperatures are self-learned in a state in which they are set.

Furthermore, the flow rate measurement device of this exemplary embodiment need not to be additionally provided with a specially purposed temperature detection unit such as a thermistor and a thermocouple, so that temperatures can be easily obtained.

Furthermore, in the flow rate measurement device of this exemplary embodiment, reference clock B such as a ring oscillator can be configured on the same semiconductor as an electronic circuit for achieving flow rate calculation unit 11 from transmitting unit 7. Therefore, a temperature of the semiconductor itself can be detected. As a result, temperature characteristics of a measurement circuit unit including a measurement semiconductor provided with a ring oscillator or the like can be corrected further accurately. At this time, even when reference clock B cannot be configured on the same semiconductor, it may be configured on the same printed circuit board. In this case, the neighboring temperature can be detected accurately.

In the above-mentioned exemplary embodiment, as a method for measuring a flow rate, an example using an ultrasonic wave is described. However, the method is not limited to this example. Any flow rate measurement devices, for example, a thermal flow rate measurement device using other thermal method of flow measurement, can be applied as long as the devices include a clock for managing time. In particular, since digital method devices are basically provided with a clock (an oscillation generator), the same offset flow rate can be adjusted by using temperature characteristics of the clock (the oscillation generator). Furthermore, when a ring oscillator is used in order to measure time more accurately, the same effect can be expected.

As described above, a flow rate measurement device of the present invention includes a flow rate signal detection unit for detecting a flow rate signal of a fluid to be measured flowing through a flow path, a flow rate calculation unit for calculating a flow rate from the flow rate signal detected by the flow rate signal detection unit, and an oscillation circuit for generating a reference clock. Furthermore, the flow rate measurement device includes a temperature calculation unit for calculating a temperature from a frequency change resulting from a temperature change of the oscillation circuit, and a flow rate correction unit for correcting the flow rate calculated by the flow rate calculation unit by obtaining an offset flow rate at a desired temperature based on the temperature calculated by the temperature calculation unit.

With this configuration, it is possible to obtain a temperature at high accuracy and to obtain an offset flow rate at the temperature. Thus, the measured flow rate can be corrected by the offset flow rate from the calculated flow rate at a desired temperature. As a result, a highly accurate flow rate measurement device which is not affected by a temperature change.

Furthermore, the flow rate measurement device of the present invention includes a pair of oscillators which are provided in a flow path through which a fluid to be measured flows, and which transmit and receive an ultrasonic wave signal; a transmitting unit for driving a first oscillator of the pair of oscillators; a receiving unit for receiving the ultrasonic wave signal from a second oscillator of the pair of oscillators; a time measurement unit for measuring propagation time between transmission and reception of the ultrasonic wave signal; a flow rate calculation unit which measures a flow velocity of the fluid to be measured from the propagation time measured by the time measurement unit, and calculates a flow rate from the flow velocity. Furthermore, the flow rate measurement device includes an oscillation circuit for generating a reference clock for measuring the propagation time; a temperature calculation unit for calculating a temperature from a frequency change resulting from a temperature change of the oscillation circuit; and a flow rate correction unit for correcting the flow rate calculated by the flow rate calculation unit by obtaining an offset flow rate at a desired temperature based on the temperature calculated by the temperature calculation unit.

With this configuration, a measured flow rate can be corrected by an offset flow rate at a desired temperature from the flow rate calculated based on the temperature. As a result, it is possible to achieve a highly accurate flow rate measurement device which is not affected by the temperature change.

Furthermore, in the flow rate measurement device of the present invention, the flow rate correction unit includes a correction learning unit for learning a correction value of the offset flow rate specified by the propagation time measured by the time measurement unit and the temperature calculated by the temperature calculation unit.

With this configuration, the flow rate correction unit includes a correction learning unit for learning a correction value of an offset amount. This permits correction by learning the offset amount by a temperature. As a result, correction accuracy can be improved, or the like.

INDUSTRIAL APPLICABILITY

According to the present invention, a flow rate of a fluid to be measured can be measured accurately by correcting a flow rate calculated by the flow rate calculation unit by an offset flow rate at a desired temperature based on a temperature obtained from a frequency change of an oscillation circuit. Thus, the present invention is useful for technical field of a flow rate measurement device for measuring a flow rate of a fluid to be measured, for example, gas, water, or the like, by using measurement of propagation time of an ultrasonic wave.

What is claimed is:

1. A flow rate measurement device comprising:
   a flow rate signal detection unit for detecting a flow rate signal of a fluid to be measured flowing through a flow path;
   a flow rate calculation unit for calculating a flow rate from the flow rate signal detected by the flow rate signal detection unit, the flow rate calculation unit having stored therein an offset flow rate determined by measuring flow rates at zero fluid flow;
   an oscillation circuit for generating a reference clock;
   a temperature calculation unit for calculating a temperature from a frequency change resulting from a temperature change of the oscillation circuit; and
   a flow rate correction unit for correcting the flow rate calculated by the flow rate calculation unit by obtaining a corrected offset flow rate at a desired temperature, based on the temperature calculated by the temperature calculation unit using a zero point flow reference voltage at two different temperatures spaced apart about a reference temperature and a corresponding reference clock signal of the oscillation circuit, and correcting the flow rate to reflect a temperature offset to the offset flow rate due to a temperature change by applying the corrected offset flow rate to the offset flow rate,
   wherein the flow rate correction unit stores predetermined relations between temperatures and offset flow rates with respect to two or more temperatures at two or more distinct time points.

2. A flow rate measurement device comprising:
   a pair of oscillators provided in a flow path through which a fluid to be measured flows, the oscillators transmitting and receiving an ultrasonic wave signal;
   a transmitting unit for driving a first oscillator of the pair of oscillators;
   a receiving unit for receiving the ultrasonic wave signal from a second oscillator of the pair of oscillators;
   a time measurement unit for measuring propagation time between transmission and reception of the ultrasonic wave signal;
   a flow rate calculation unit which measures a flow velocity of the fluid to be measured from the propagation time measured by the time measurement unit, and calculates a flow rate from the flow velocity, the flow rate calculation unit having stored therein an offset flow rate determined by measuring flow rates at zero fluid flow;
   an oscillation circuit for generating a reference clock for measuring the propagation time;
   a temperature calculation unit for calculating a temperature from a frequency change resulting from a temperature change of the oscillation circuit; and
   a flow rate correction unit for correcting the flow rate calculated by the flow rate calculation unit by obtaining a corrected offset flow rate at a desired temperature based on the temperature calculated by the temperature calculation unit using a zero point flow reference voltage at two different temperatures spaced apart about a reference temperature and a corresponding reference clock signal of the oscillation circuit, and correcting the flow rate to reflect a temperature offset to the offset flow rate due to temperature change by applying the corrected offset flow rate to the offset flow rate,
   wherein the flow rate correction unit stores predetermined relations between temperatures and offset flow rates with respect to two or more temperatures at two or more distinct time points.

3. The flow rate measurement device according to claim 1, wherein the flow rate correction unit includes a correction learning unit for learning a correction value of the offset flow rate specified by the propagation time measured by a time measurement unit and the temperature calculated by the temperature calculation unit.

4. The flow rate measurement device according to claim 2, wherein the flow rate correction unit includes a correction learning unit for learning a correction value of the offset flow rate specified by the propagation time measured by the time measurement unit and the temperature calculated by the temperature calculation unit.

* * * * *